(12) United States Patent
Torkkel (10) Patent No.: US 9,953,153 B2
(45) Date of Patent: Apr. 24, 2018

(54) SHARING CONTENT ONLINE (75) Inventor: Juha Torkkel, Vantaa (FI)

(73) Assignee: F-Secure Corporation, Helsinki (FI)

( * ) Notice: Subject to any disclaimer, the term of this patent is extended or adjusted under 35 U.S.C. 154(b) by 513 days.

(21) Appl. No.: 13/979,696

(22) PCT Filed: Jan. 17, 2011

(86) PCT No.: PCT/EP2011/050543
§ 371 (c)(1),
(2), (4) Date: Aug. 12, 2013

(87) PCT Pub. No.: WO2012/097864
PCT Pub. Date: Jul. 26, 2012

(65) Prior Publication Data
US 2013/0333022 A1 Dec. 12, 2013

(51) Int. Cl.
G06F 21/36 (2013.01)
G06F 21/31 (2013.01)
G06F 21/60 (2013.01)
G06F 21/64 (2013.01)
H04L 29/06 (2006.01)

(52) U.S. Cl.
CPC .............. *G06F 21/36* (2013.01); *G06F 21/31* (2013.01); *G06F 21/60* (2013.01); *G06F 21/645* (2013.01); *H04L 63/1483* (2013.01)

(58) Field of Classification Search
CPC .......... G06F 21/31; G06F 21/32; G06F 21/36; G06F 21/60; G06F 21/645; H04L 2209/60; H04L 9/3231; H04L 9/32; H04L 9/3271; H04L 63/1483
See application file for complete search history.

(56) References Cited

U.S. PATENT DOCUMENTS

2007/0288750 A1* 12/2007 Camenisch ............. G06F 21/33
713/168
2009/0064327 A1 3/2009 Stukanov ........................ 726/22
2010/0235318 A1* 9/2010 Wang ..................... H04L 63/20
706/62

FOREIGN PATENT DOCUMENTS

WO WO 2007/044619 A2 4/2007

OTHER PUBLICATIONS

Asher, Craig, et al., "Security and Privacy Preservation in Human-Involved Networks", INETSEC 2009, Open Research Problems in Network SEcurity, Jan. 1, 2009, 10 pgs.*

(Continued)

Primary Examiner — Matthew Smithers
(74) Attorney, Agent, or Firm — Harrington & Smith (57) ABSTRACT

A method of providing a degree of authentication for a content link presented to peer user(s) by a sharing user via the Internet. The method includes, at a server, associating the content link with authentication data provided by the sharing user, and storing the associated content link and authentication data in a storage location. A redirection link that links to the stored associated content link and authentication data is presented to a peer user via a user interface of a client computer of the peer user. Upon submission of an access request from the client computer to the redirection link, the content link and the authentication data is delivered to the client computer. The authentication data is presented to the peer user via the user interface and the peer user is able to choose, via the user interface, to submit an access request to the content link.

12 Claims, 7 Drawing Sheets

(56) References Cited

OTHER PUBLICATIONS

Sun, San-Tasi, et al., "Secure Web 2.0 Content Sharing Beyond Walled Gardens", Computer SEcurity Applications Conference, Dec. 7, 2009, pp. 409-418.*
Asher, Craig, et al., "Security and Privacy Preserveration in Human-Involved Networks", INETSEC 2009, Open Research Problems in Network Security, Jan. 1, 2009, 10 pgs.*
Josang, Audun, et al., "Authentication for Humans", Proceedings of the 9th International Conference on Telecommunication Systems, Jan. 1, 2001, 10 pgs.*
McFarland, David Sawyer, "Powerful Positioning Strategies", CSS The Missing Manual, O'Reilly Media, Inc., Aug. 24, 2009, 15 pgs.*
Sun, San-Tsai, et al., "Secure Web 2.0 Content Sharing Beyond Walled Gardens", Computer Security Applications Conference, Dec. 7, 2009, 10 pgs.
Lambert, Alex P., et al, "Waterhouse: Enabling Secure E-mail with Social Networking", Proceedings of the 27th International Conference Extended Abstracts on Human Factors in Computing Systems, Apr. 4, 2009, 6 pgs.
Josang, Auden, et al., "Authentication for Humans", Proceedings of the 9th International Conference on Telecommunication Systems, Jan. 1, 2001, 10 pgs.
Dawson, Alexander, "Sexy Tooltips with Just CSS", Jun. 16, 2010, http://sixrevisions.com, 9 pgs.

* cited by examiner

SHARING CONTENT ONLINE

TECHNICAL FIELD

The present invention relates to a method of sharing content online and in particular to a method of providing a degree of authentication to a link used to share content online.

BACKGROUND

There are an increasing number of services on the Internet that enable peer-to-multi-peer sharing of online content, for example email, social networking websites, and instant messenger services. The content being shared can be for example photos, videos, links to web pages, etc. A common mechanism involves a sharing user providing a link to one or more peer users ("peers"), with a peer clicking the link to download the content. Generally, peers are happy to click the link and access the shared content provided that the link appears to have originated from a trusted sharing user, e.g. friend or colleague.

Unfortunately there are many ways in which these content sharing services can be abused by malicious third parties in order to direct peers to content "owned" by those malicious third parties. Such content might be malicious, e.g. a fake bank website, or may be inappropriate or simply annoying.

Figure 1:
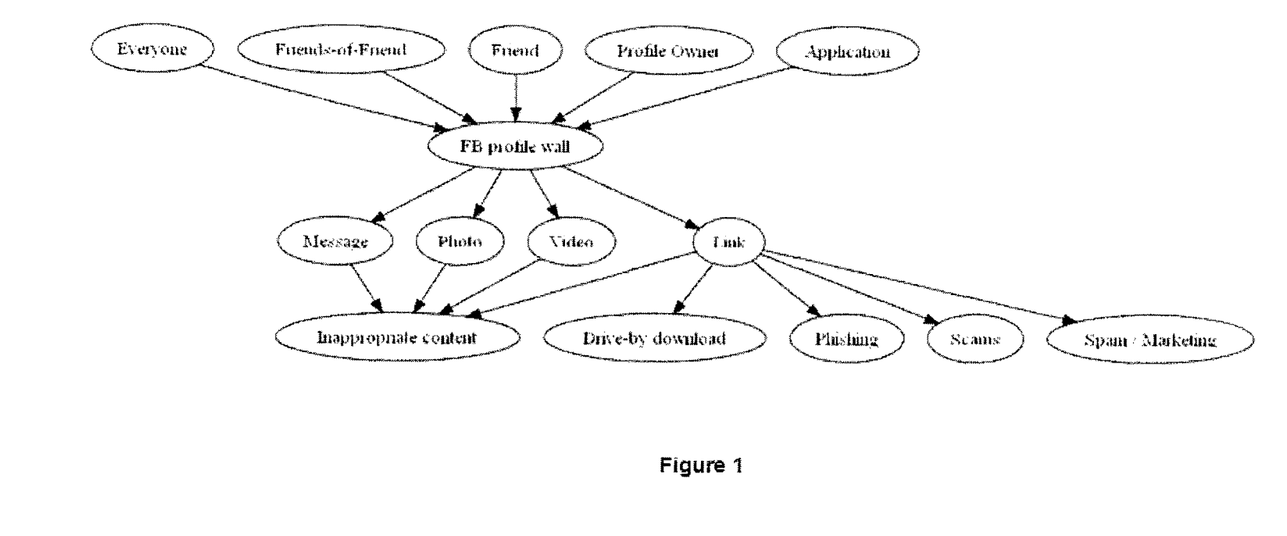
FIG. 1 shows a representation of the inputs, post-types and associated risks for a Facebook profile wall.

Consider for example the social networking website Facebook™. Each user has their own Facebook page on which they can provide "posts". These posts can comprise, for example, written status updates/messages, shared photos, links, videos etc. The area of the user's Facebook page which contains these posts is known as their "wall". There are a number of ways in which posts can appear on a user's wall, and FIG. 1 shows a representation of all the potential inputs to a Facebook user's profile wall. FIG. 1 also shows the types of media that are permitted as posts, and the risks that they can lead to. For example, a message, photo or video posted to a user's wall could be inappropriate content, and a link presents the highest number of risks as it could lead to inappropriate content, a drive-by download (a download that happens without a person's knowledge, or with a person's knowledge but without understanding of the consequences), a phishing attack, scams, or spam/unwanted marketing.

Facebook does provide privacy settings which, in the context of content sharing, limit the number of potential inputs to a user's profile wall, and also limit the potential audience that is able to view the posts on the user's profile wall. For instance, a user may only allow friends and friends-of-friends to post on his or her wall, blocking the ability to post from everyone else and applications. The user may also limit who is able to see his or her wall to just friends, for example.

These privacy settings do not provide a good alternative to proper authenticity or security mechanisms. A user may not wish to set high privacy settings, for example, if he or she wants everyone to be able to view and post on his or her wall. Even if high privacy settings are in place, they have no effect if the profile owner's or his/her friend's account is compromised, or if the user is tricked into granting access privileges to a Facebook application.

Abuse of trust and attacks such as those described above can also arise in other peer-to-multi-peer systems, for example email. A user's email account can become compromised, e.g. through a phishing attack, or perhaps due to the user not logging out properly from a public computer. As a consequence, an email which contains a link to unsuitable or malicious content can be sent from the user's email account to his contacts such that it appears to have come from him or her. A web page, e.g. personal or corporate, might also be attacked, replacing valid links with inappropriate links, or introducing new, and inappropriate, links.

SUMMARY

It is an object of the present invention to overcome or at least mitigate the problems discussed above. This object is achieved by allowing sharing users to attach some authentication data to a link such that this data is presented to peer users before requests to download information behind the link are fulfilled.

According to a first aspect of the invention there is provided a method of providing a degree of authentication for a content link presented to one or more peer users by a sharing user via the Internet. The method comprises, at a server, associating said content link with authentication data provided by said sharing user, and storing the associated content link and authentication data in a storage location. A redirection link that links to the stored associated content link and authentication data is then presented to a peer user via a user interface of a client computer of the peer user. Upon submission of an access request from said client computer to said redirection link, said content link and said authentication data is then delivered to the client computer. The authentication data is then presented to the peer user via said user interface and the peer user is able to choose, via the user interface, to submit an access request to said content link.

Embodiments of the present invention may provide a simple and lightweight method of providing a degree of authenticity for links to shared content that allows a peer user some piece of mind when accessing content shared by a sharing user whilst not greatly inconveniencing either the sharing user or peer user.

The authentication data may be presented to the user in a number of different ways. For example, upon submission of an access request from said client computer to said redirection link, a new web page may be loaded into a browser window, with that page including a further link. Clicking on that further link causes the authentication data, e.g. an audio clip, to be streamed to the peer user's computer and played out. Alternatively, the further web page may include the authentication data, with the data being played out automatically upon receipt of the page, or upon further selection by a user, e.g. clicking on a button or hovering the curser over a button or "link".

The method may further comprise submitting said content link and said authentication data to said server from a client computer of the sharing user.

Said content link and said authentication data may be submitted to said server via a web page displayed on the client computer of the sharing user, or alternatively via an email client, a stand-alone application, an internet browser, a mobile device application or an instant messenger application running on the client computer of the sharing user.

The authentication data may comprise an audio and/or a video file, and the method may comprise recording an audio and/or video clip at a client computer of said sharing user and sending it to said server. The authentication data may further comprise a picture provided to the sharing user to describe during the recording of the audio and/or video clip.

The method may further comprise presenting the authentication data to the peer user via said user interface, receiving from the peer user, via said interface, an acceptance or refusal of an invitation to continue; and in the event of a received acceptance, submitting an access request to said content link and receiving content behind that link.

The content link and said redirection link may be Uniform Resource Locators, URLs, and may be web links, and the server may be a web server or web server cluster.

The client computer of the sharing user and/or the peer user may be a personal computer, a mobile device, or any other internet-connected device.

According to a second aspect of the invention, there is provided a method of providing a degree of authentication for a content link presented to a peer user by a sharing user via the Internet, the method comprising:

at a computer of a peer user, displaying said content link or a representation thereof, receiving user input directing a graphical cursor over the displayed link or representation, and in response displaying a pop-up that enables the presentation of authentication data and which pop-up also contains said content link as a clickable link.

The section that enables the presentation of the authentication data may contain a clickable button to initiate the presentation of the authentication data.

The pop-up dialog box can be a CSS hover pop-up dialog box.

The computer of the peer user can be a personal computer, a mobile device, or any other internet-connected device.

According to a third aspect of the invention, there is provided a web server or web server cluster configured to host a content sharing web service, such that a sharing user is able to post content onto a personal web page or pages for downloading by peer users. The web server or web server cluster comprises a first user interface for receiving from a sharing user a content web link or a file and, in the case of a received file, for storing the file and determining a content web link linking to the stored file, and for receiving authentication data from said sharing user. The web server or web server cluster also comprises a content manager for associating and storing said content web link and said authentication data, for determining a redirection web link linking to the stored content web link and authentication data, and for including said redirection web link on said personal web page or pages of the sharing user. The web server or web server cluster further comprises a second user interface for allowing peer users to access said personal web page or pages of the sharing user, for receiving a request from a peer user to deliver content behind said redirection web link, and for delivering in response said content web link and authentication data to the requesting peer user.

The first user interface may be configured to provide a web page to a client computer of said sharing user, the web page enabling the sharing user to submit said content web link and said authentication data to the web server or web server cluster.

The authentication data may be an audio and/or video file.

DETAILED DESCRIPTION

Humans are very good at picking up cues in spoken dialogue, photographs, videos and the like, for the purpose of determining the authenticity of the content. For example, a person can tell with a high degree of certainty that a short segment of speech was recorded by a friend or colleague. This behaviour can be taken advantage of to provide an extremely simple and lightweight mechanism for authenticating, at least with a low level of security, a link being offered by a sharing user to peer users.

Figure 2A:
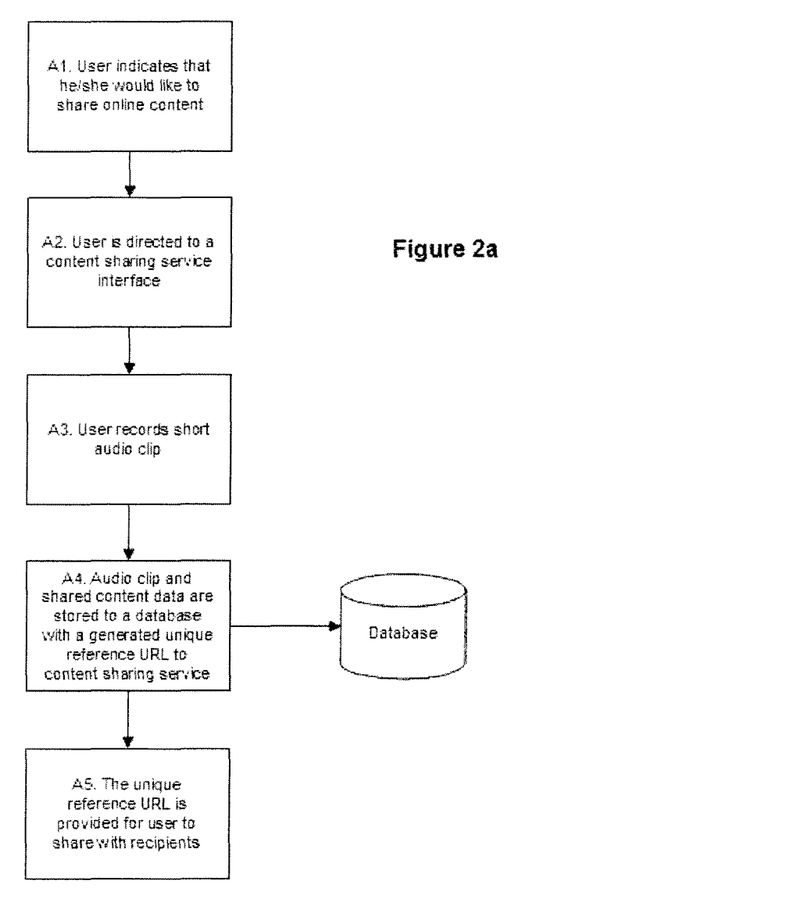
FIGS. 2a and 2b are flow diagrams showing a two-part method for safely sharing content online.
Figure 2B:
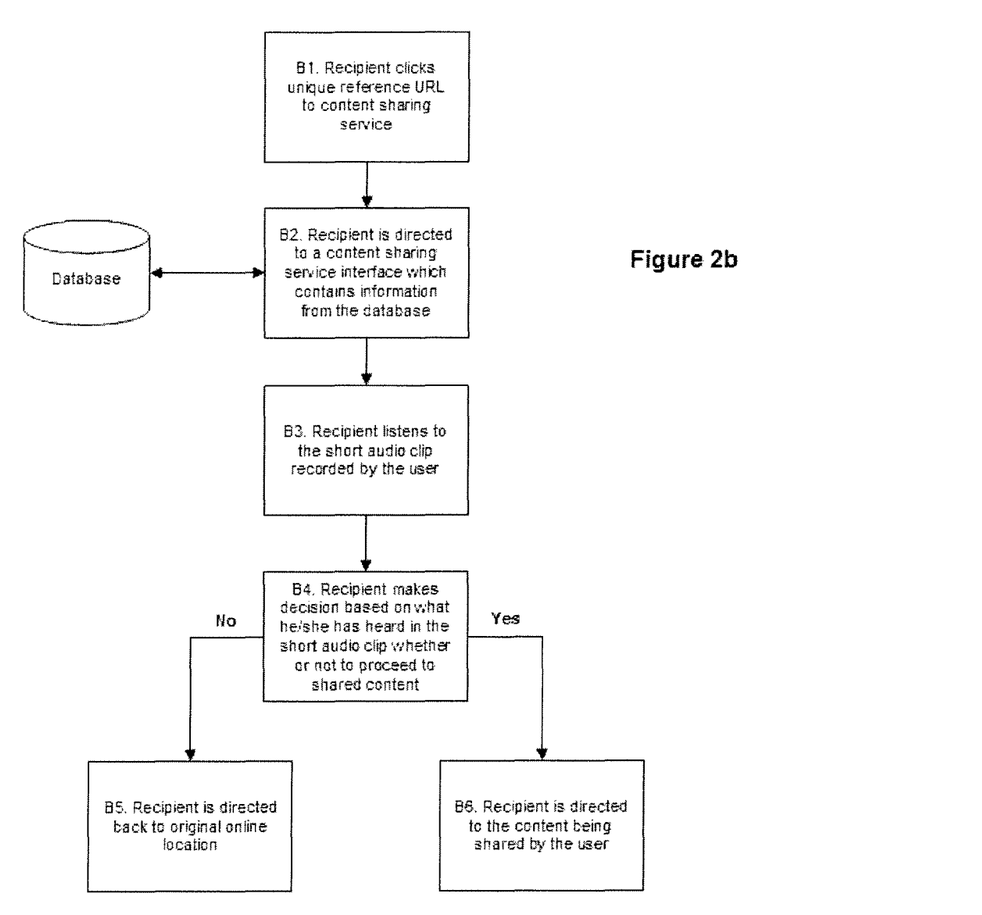

FIGS. 2a and 2b are flow diagrams that illustrate a two-part method for allowing a sharing user to share content in an online environment such that a peer user is able to trust that the content has in fact been shared by the sharing user. FIG. 2a shows the method carried out by the sharing user, and FIG. 2b shows the method carried out by a peer user. Referring firstly to FIG. 2a, the steps of the method carried out by the sharing user are:

A1. The sharing user indicates that he/she would like to share content.

A2. The sharing user is directed to a content sharing service interface.

A3. The sharing user records a short audio clip.

A4. The audio clip, together with data identifying the content to be shared, is stored on a network database, and a unique reference Uniform Resource Location (URL) to the content sharing service is generated that can identify the data in the database.

A5. The unique reference URL is provided to the user to share with any desired peer users, e.g. "www.safely-sharedcontent.com/john.smith.link1"

Referring now to FIG. 2b, the steps of the method carried out by a peer user are:

B1. The peer user clicks on the unique reference URL.

B2. The peer user is directed to a content service sharing interface, which contains information from the database, including the audio clip.

B3. The peer user listens to the short audio clip that has been recorded by the sharing user. From the audio clip, the peer user is able to determine that the sharing user has personally sent the message and also that it was the sharing user's intent to send the message.

B4. The peer user makes an informed decision, based on what he/she has heard in the short audio clip, to proceed to the shared content or to cancel the request.

B5. If the peer user decides not to proceed to the shared content then he/she is directed back to their original online location.

B6. If the peer user is satisfied with the authenticity of the shared content and decides to proceed, then he/she is directed to the content that is being shared by the sharing user.

An example of the content of the short audio clip recorded by the sharing user is: "It is Friday 15$^{th}$ at 11.10. This is a link about a news story I thought you would be interested in." On hearing this audio clip, the peer user will be able to recognise their friend's voice and therefore trust the origin of the link to the shared content. A date and time might provide the peer user with some confidence that the link was recently uploaded by the sharing user.

The method can be further illustrated by considering an example. In this example, a sharing user connects to the internet using a client computer ("client") and accesses a content sharing web service hosted on one or more web servers ("content sharing servers"). This web service may be a social networking site or a hosted application on such site, for example Facebook.

Figure 3:
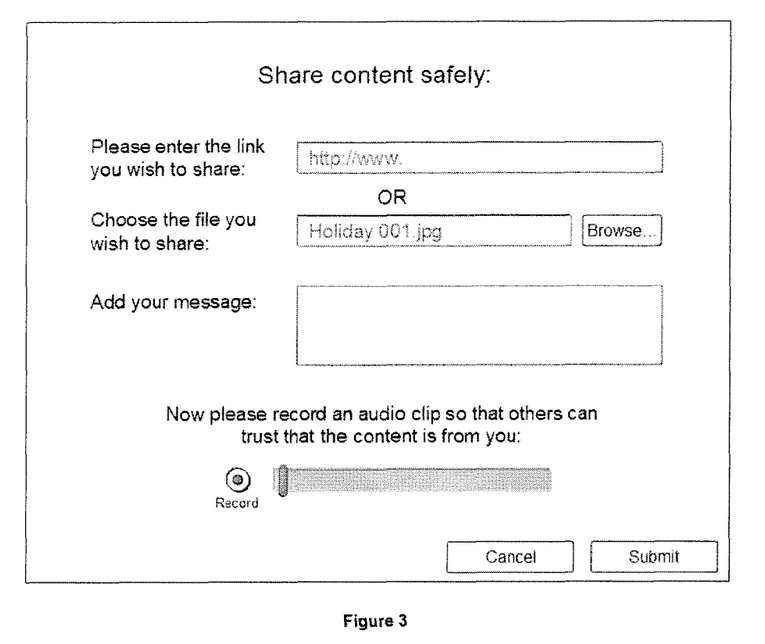
FIGS. 3 and 4 show representations of a web page used by the sharing user.

FIG. 3 shows a web page that is provided to a sharing user logged-on to the social networking site and wanting to share content. The web page prompts the sharing user to identify or upload the content that they wish to share and also to leave a text message that will accompany the shared content for peer users to read. The content the sharing user wishes to upload may simply be a link (URL) to another website, or perhaps a file. The files that the sharing user is able to upload and share may be limited to certain file types, e.g. picture and video files only. The sharing user is then prompted to record an audio clip that will provide limited authentication to any peer user wishing to view the shared content. The audio clip may be limited to a certain length, for example 10 seconds, and so an indication of the remaining recoding time may be provided. Once the sharing user has recorded the audio clip, he/she clicks 'Submit' and the recorded audio clip is uploaded to one of the content sharing servers, and stored by that server on an associated database.

The information stored in the database includes data on the content being shared, any text message, and the recorded audio clip. If a file is being shared (uploaded) rather than merely a URL, the file can be either hosted on the provider's server along with the message and the audio clip, or alternatively it may be hosted using other file-hosting services: in either case a URL linking to the file is stored in the database. If other file hosting services are used, the sharing user can be given the option of which file-hosting service they would like to use.

On receiving the data and storing it in the database, the server creates a unique reference URL that is mapped to the final destination URL (that is either a web URL or a URL via which a file can be downloaded). This unique reference URL acts as an authentication gateway for peer users to access the shared content that the sharing user has provided.

Figure 4:
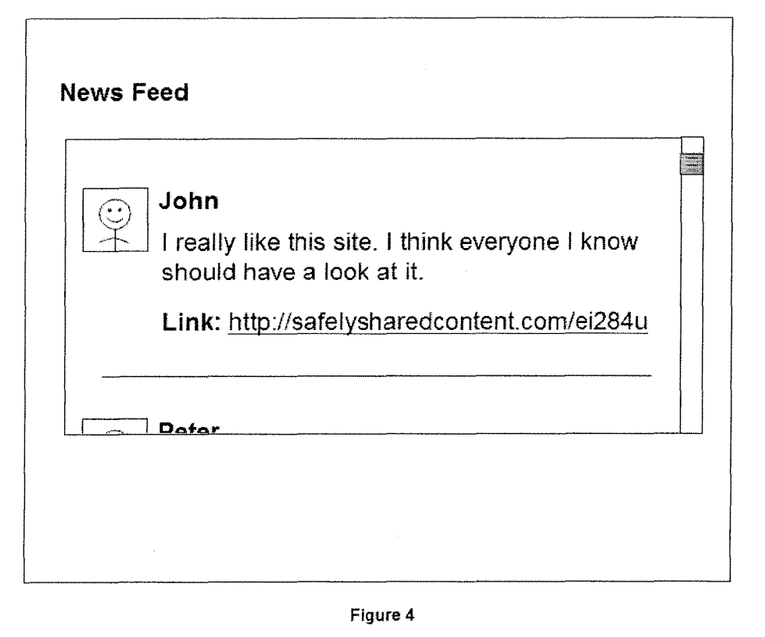

The generated unique reference URL and the accompanying text message is then posted to the sharing user's page on the social networking site, as shown in FIG. 4. The sharing user's text message appears together with the unique reference URL, i.e. a URL directly linking to the shared content is not presented. [Of course, the URL could be associated with the text message such that the text message is presented as a "clickable" link. The URL could also be associated with some other object, e.g. a graphic or image.]

Figure 5:
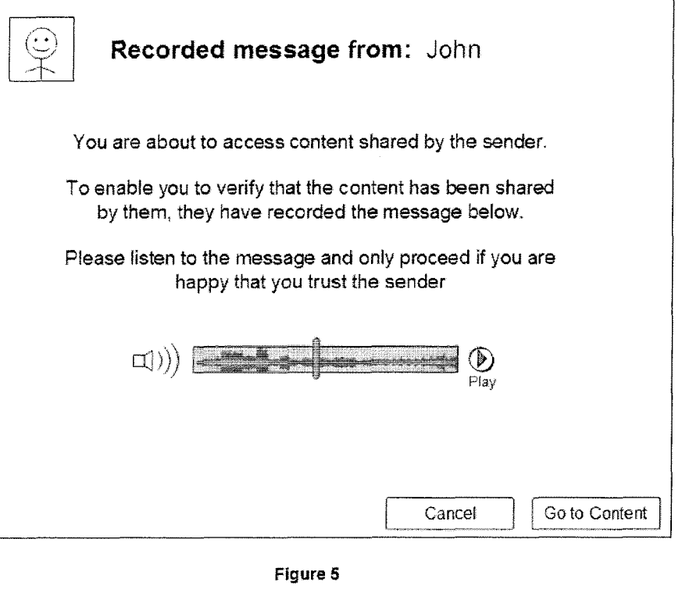
FIG. 5 shows a representation of a web page used by a peer user.

When a peer user wants to access the shared content that the sharing user has posted, he/she clicks on the displayed link which will take them to a gateway page on the content sharing service provider's website. FIG. 5 shows the relevant page on the content sharing service provider's website. The page presents an explanation to the peer user of how they can proceed to the shared content. The peer user can first choose to listen to the short audio clip left by the sharing user, by clicking the appropriate link, and can then make an informed decision as to whether or not they trust that the content has been shared by the sharing user they expected. If the peer user does not recognise the voice in the clip, or if they do not believe that the message is authentic, then they can select the "cancel" link and return to the previous page. Alternatively, if the peer user is satisfied with the authenticity of the voice in the clip, or does not care about authenticity, he/she can click on the "Go to Content" button, which is a link to the shared content. This will result in the shared content being displayed or otherwise downloaded to the peer user's computer.

Figure 6:
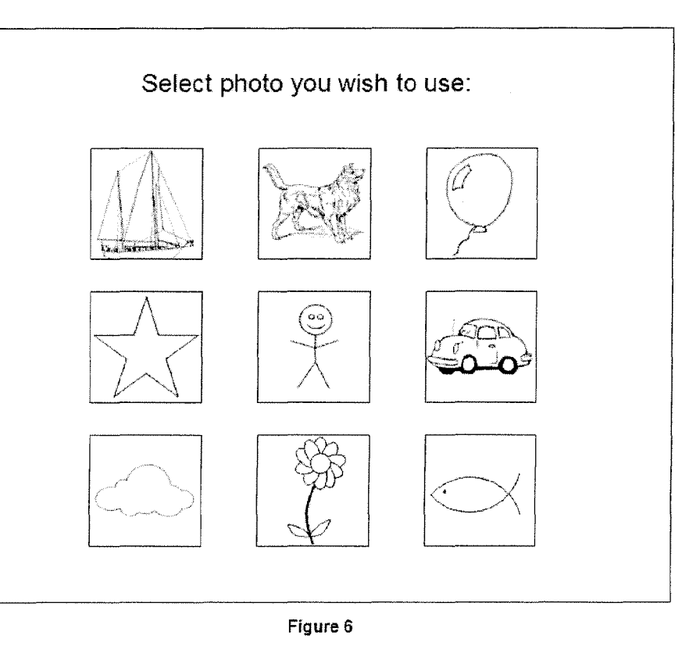
FIGS. 6, 7 and 8 show representations of a web page of a second embodiment used by the sharing user.

The method can be further illustrated by a second example. A visual aspect is added to the method of the previous example. This makes the audio clips much harder to exploit using computer automation. FIG. 6 shows a representation of the first screen of a web page provided by a content sharing website to a sharing user that wishes to share content. Nine authentication pictures are provided that have been chosen randomly by the content sharing website from a library that consists of a large number of pictures. For example, the library will contain millions of pictures. The sharing user chooses one of the authentication pictures that they would like to use, and is taken to a second screen as shown in FIG. 7.

Figure 7:
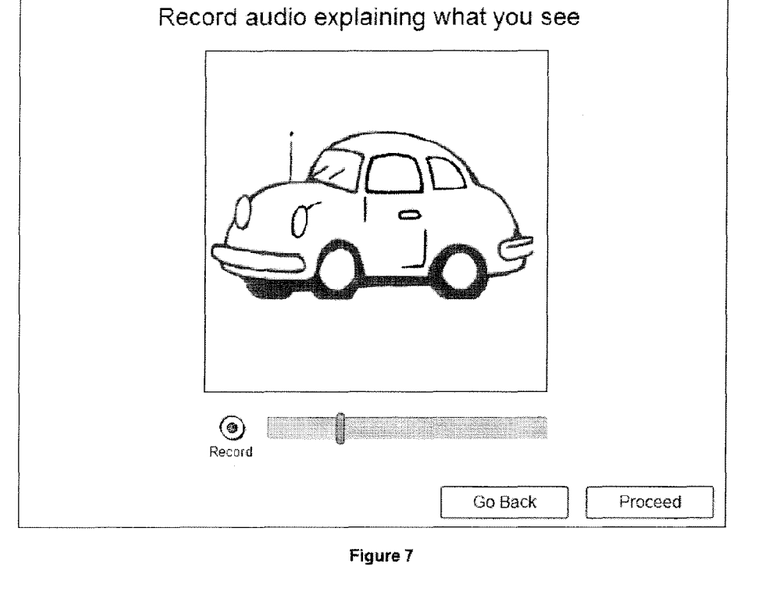
Figure 8:
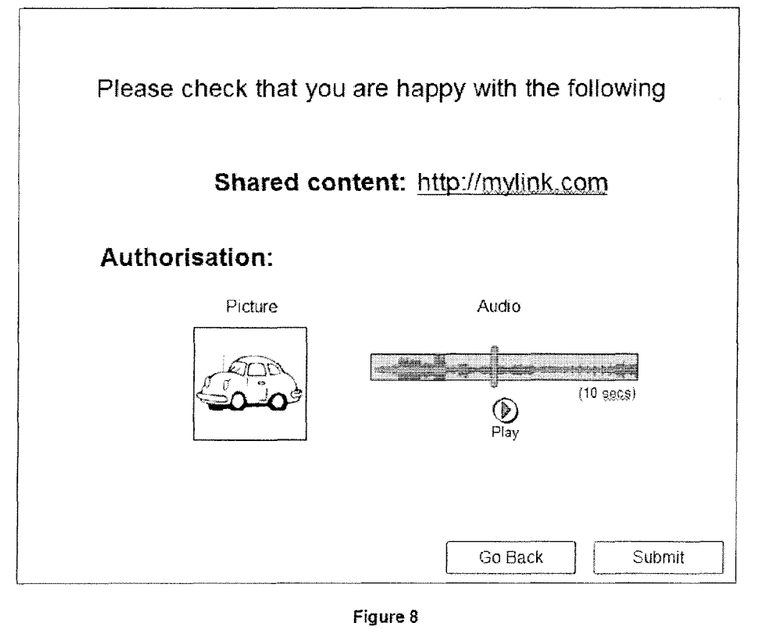

In FIG. 7, the picture chosen by the sharing user is made larger and the sharing user is prompted to record an audio clip describing the picture, or a specific aspect of it. The sharing user is free to choose any aspect of the picture that he/she wishes to describe. For example, in FIG. 7, the sharing user may wish to concentrate on the shape, colour, number of doors or style of the car. After finishing recording the audio clip, the sharing user is taken to a page where they are able to review the link they are sharing as well as the audio clip and authentication picture before posting their message, as shown in FIG. 8.

On pressing submit, the shared content data, the message content, the recorded audio clip and the chosen authentication picture, are stored in a database which is located on a server maintained by the provider of the service for safely sharing content. On receiving the data and storing it in the database, the server creates a unique reference URL to the service provider's website, and the sharing user's message along with the generated reference URL is posted to the sharing user's page.

Figure 9:
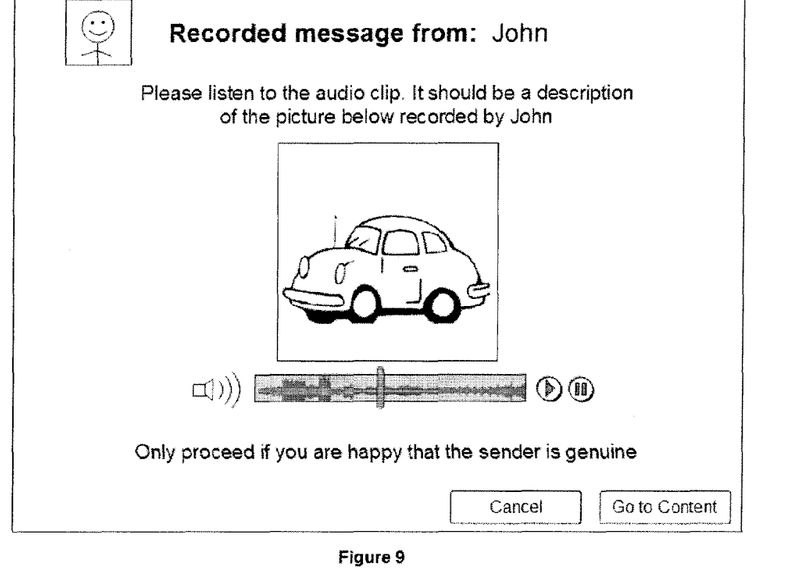
FIG. 9 shows a representation of a web page of the second embodiment used by a peer user.

When a peer user accesses the sharing user's page and clicks the unique reference URL, the peer user will be taken to a web page run by the service provider, as shown in FIG. 9. The authentication picture chosen by the sharing user is displayed and a button is provided for playing back the recorded audio clip. The peer user is asked to listen to the audio clip, and advised that it should be a clip recorded by the sharing user describing the picture. Once the peer user has listened to the audio clip, the peer user is able to make an informed decision as to whether or not to continue to access the shared content. The use of images in this way in combination with the audio to provide authenticity for the shared content makes it difficult to exploit using computer automation. Computer automation would be required to understand what the contents of a picture was, guess what aspect of the picture the user would be likely to describe, and be able to mimic the sharing user's voice and vocal characteristics.

Figure 10:
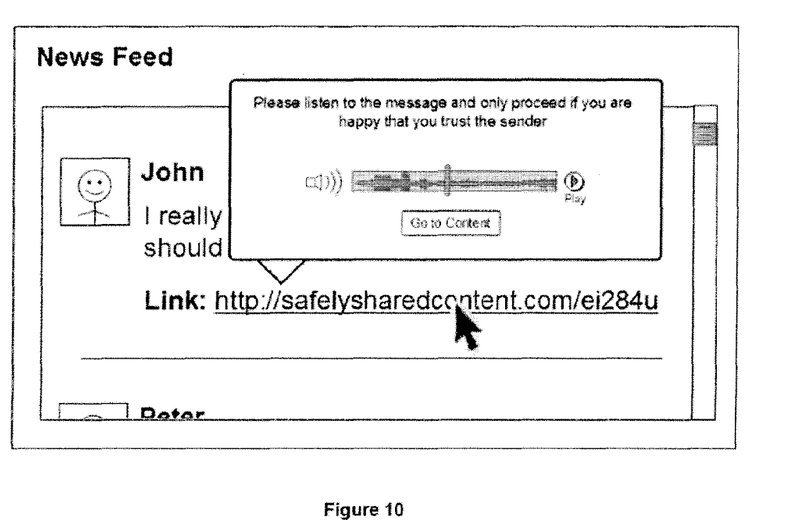
FIG. 10 shows a representation of a pop-up box interface used by a peer user.

FIG. 10 shows an example of an alternative user interface that is presented to a peer user. In this example, a peer user who shows interest in following a link to shared content places his or her mouse cursor over a section of text that appears to be the link to the shared content. The "link" however is not active in the sense that clicking on it will not cause the browser to submit a download request. Rather, on positioning the cursor over the text, or "hovering" over it, a pop-up dialog box appears which instructs the peer user to listen to the audio clip before deciding whether or not to proceed to the shared content. The pop-up dialog box is a Cascading Style Sheets (CSS) hover pop-up which allows the peer user to interact with its contents. Thus, the peer user can click on the button to play the audio, and then, if appropriate, click on the link to the shared content, shown in FIG. 10 as a "Go to Content" button. This alternative method is particularly desirable as it does not require the peer user to be directed away from the original page in order to listen to the audio clip, therefore providing a quicker and more succinct process whilst at the same time providing the same level of authenticity as previous examples.

The method described here is not intended to provide a guarantee of authenticity. Any method that does guarantee authenticity is likely to prove inconvenient to both the sharing user and peer users, and require installation of custom software on client computers. In contrast, the present method is both simple to use and lightweight in terms of its implementation. It is completely compatible with legacy equipment and its use is entirely optional. Uptake of the authentication service can be expected to be high.

The method describes the sharing user recording an audio clip to provide authentication to peer users as an example, however it will be understood that other suitable media types can be used. For example the sharing user may record a video clip.

It will be understood that social networking sites have only been used as one example of where the method can be implemented. The file sharing service could be provided as a stand-alone service where a sharing user, after providing the shared content and authentication data, is simply provided with a redirection link which he or she can copy and paste anywhere they like. Another example is in an email client such as Microsoft Outlook™. In this instance Outlook will have an add-on component, e.g a plug-in, which detects shared links in composed draft emails and provides an interface that allows the user to record the authenticating audio clip directly from the email client. The server receives the shared link and the audio clip, and returns a unique reference URL to the client which places this reference URL into the email text in place of the actual link.

Other examples of where the method can be implemented include a stand-alone application, an Internet browser (as a built-in feature, or a plug-in), an embedded web application, web page publishing software, a mobile device application and instant messaging services.

It will be appreciated by the person of skill in the art that various modifications may be made to the above described methods without departing from the scope of the present invention.

The invention claimed is:

1. A method of providing authentication for a content link presented to one or more peer users by a sharing user via the Internet, the method comprising:
    at a server, associating said content link with authentication data provided by said sharing user, wherein the authentication data is recorded at a client computer of the sharing user and is received at the server, the authentication data comprising at least one of an audio file and a video file personally created by the sharing user;
    identifying the sharing user and content associated with the content link;
    storing the associated content link and authentication data in a storage location;
    generating a redirection link that links to the stored associated content link and authentication data;
    presenting the redirection link to a peer user, via a user interface of a client computer of the peer user;
    upon submission of a first access request from said client computer to said redirection link, delivering said content link and said authentication data identifying the sharing user and the content associated with the content link to the client computer;
    presenting via said user interface the authentication data to the peer user of the client computer with an invitation to continue, wherein the invitation to continue comprises a request to the peer user of the client computer to identify based on the authentication data provided by the sharing user whether to accept the invitation to continue;
    receiving from the peer user, via the user interface, an indication of selection by the peer user of acceptance of the invitation to continue; and
    based on the indication of acceptance, submitting a second access request to said content link and receiving the content associated with the content link.

2. A method according to claim 1 and comprising submitting said content link and said authentication data to said server from a client computer of the sharing user.

3. A method according to claim 2, wherein said content link and said authentication data are submitted to said server via a web page displayed on the client computer of the sharing user.

4. A method according to claim 2, wherein said content link and said authentication data are submitted to said server via an email client, a stand-alone application, an internet browser, a mobile device application or an instant messenger application running on the client computer of the sharing user.

5. A method according to claim 2, wherein the client computer of the sharing user and/or the peer user is a personal computer, a mobile device, or any other internet-connected device.

6. A method according to claim 1, wherein the authentication data further comprises a picture provided to the sharing user to describe during the recording of the audio and/or video clip.

7. A method as claimed in claim 1, wherein the user interface comprises a web page presenting a request to the peer user of the client computer to identify based on the authentication data provided by the sharing user either acceptance or refusal of the invitation to continue, and wherein the acceptance or refusal of the invitation to continue is using one of a cancel or go to content button displayed on the web page.

8. A method according to claim 1, wherein said content link and said redirection link are Uniform Resource Locators, URLs.

9. A method according to claim 1, wherein the content link and redirection link are web links, and the server is a web server or web server cluster.

10. A method according to claim 1, wherein said step of presenting the authentication data to the peer user results from the peer user clicking on a link presented via said user interface.

11. A web server or web server cluster configured to host a content sharing web service, such that a sharing user is able to post content onto a personal web page or pages for downloading by peer users, the web server or web server cluster comprising:
    a first user interface for receiving from a sharing user a content web link or a file and a received file, for storing the file and determining a content web link linking to the stored file, and for receiving authentication data provided by said sharing user, wherein the authentication data provided by the sharing user is recorded at a client computer of the sharing user and is received by the web server or web server cluster, the authentication data comprising at least one of an audio file and a video file personally created by the sharing user;

a content manager for associating and storing said content web link and said authentication data, for generating a redirection web link linking to the stored content web link and authentication data, on storage of the content web link and said authentication data, and for including said redirection web link on said personal web page or pages of the sharing user; and a second user interface for presenting the authentication data to each of the peer users with an invitation to continue requesting that the peer users identify based on the authentication data whether to accept the invitation to continue, for receiving a response to said invitation from a peer user of the peer users to accept said invitation to continue to said content linked to by said redirection web link, and for delivering to the peer user said content in response to the acceptance by the peer user based on the authentication data provided by the sharing user to the peer user.

12. A web server or web server cluster according to claim 11, wherein said first user interface is configured to provide a web page to a client computer of said sharing user, the web page enabling the sharing user to submit said content web link and said authentication data to the web server or web server cluster.

* * * * *